(12) United States Patent
Billman et al.

(10) Patent No.: US 7,270,487 B2
(45) Date of Patent: Sep. 18, 2007

(54) FIELD INSTALLABLE OPTICAL FIBER CONNECTOR

(75) Inventors: Bradley S. Billman, Corinth, TX (US); Scott E. Semmler, Ft. Worth, TX (US)

(73) Assignee: Corning Cable Systems LLC, Hickory, NC (US)

(*) Notice: Subject to any disclaimer, the term of this patent is extended or adjusted under 35 U.S.C. 154(b) by 266 days.

(21) Appl. No.: 10/836,761

(22) Filed: Apr. 30, 2004

(65) Prior Publication Data

US 2005/0244108 A1    Nov. 3, 2005

(51) Int. Cl.
*G02B 6/36* (2006.01)

(52) U.S. Cl. ............................ 385/77; 385/55; 385/60; 385/70; 385/72; 385/78; 385/81

(58) Field of Classification Search ............... 385/53, 385/55, 60, 70, 72, 56, 59, 62, 71, 66, 77–78, 385/63, 65
See application file for complete search history.

(56) References Cited

U.S. PATENT DOCUMENTS

| | | | | |
|---|---|---|---|---|
| 5,040,867 A | 8/1991 | de Jong et al. | | 385/60 |
| 5,748,819 A | 5/1998 | Szentesi et al. | | 385/60 |
| 5,984,531 A | 11/1999 | Lu | | 385/60 |
| 6,173,097 B1 * | 1/2001 | Throckmorton et al. | | 385/59 |
| 6,179,482 B1 * | 1/2001 | Takizawa et al. | | 385/81 |
| 6,234,685 B1 | 5/2001 | Carlisle et al. | | 385/83 |
| 6,318,903 B1 | 11/2001 | Andrews et al. | | 385/77 |
| 6,439,780 B1 | 8/2002 | Mudd et al. | | 385/83 |
| 6,540,410 B2 | 4/2003 | Childers et al. | | 385/78 |
| 6,550,979 B1 | 4/2003 | Fleenor et al. | | 385/78 |
| 6,565,262 B2 | 5/2003 | Childers et al. | | 385/76 |
| 6,609,837 B2 * | 8/2003 | Lampert | | 385/72 |
| 6,655,851 B1 | 12/2003 | Lee | | 385/78 |
| 2001/0002220 A1 * | 5/2001 | Throckmorton et al. | | 385/66 |
| 2003/0215171 A1 | 11/2003 | Lampert et al. | | 385/11 |

* cited by examiner

*Primary Examiner*—Frank G. Font
*Assistant Examiner*—Michael P. Mooney
(74) *Attorney, Agent, or Firm*—Jeffrey S. Bernard (57) ABSTRACT

A field installable optical fiber connector is provided, the connector including an inner housing defining an interior passageway extending longitudinally between a forward end and a rearward end, a first connector subassembly inserted through the rearward end of the inner housing into the interior passageway thereof. In one embodiment, the first connector subassembly includes a ferrule holder having a ferrule disposed within the ferrule holder, and an optical fiber stub disposed within the ferrule. In another embodiment, the first connector subassembly also includes a flange disposed at a first end of the ferrule holder, a spring element and a spring element retainer slidably mounted on the ferrule holder, and a collar mounted on a second end of the ferrule holder so as to capture the spring and the spring element retainer between the flange and the collar.

14 Claims, 11 Drawing Sheets

FIELD INSTALLABLE OPTICAL FIBER CONNECTOR

BACKGROUND OF THE INVENTION

1. Field of the Invention

The present invention relates generally to optical fiber connectors and, more particularly, to optical fiber connectors adapted for field installation.

2. Technical Background

Optical fibers are widely used in a variety of applications, including the telecommunications industry in which optical fibers are employed in a number of telephony and data transmission applications. Due, at least in part, to the extremely wide bandwidth and the low noise operation provided by optical fibers, the use of optical fibers and the variety of applications in which optical fibers are used are continuing to increase. For example, optical fibers no longer serve as merely a medium for long distance signal transmission, but are being increasingly routed directly to the home or, in some instances, directly to a desk or other work location.

With the ever increasing and varied use of optical fibers, it is apparent that efficient methods of coupling optical fibers, such as to other optical fibers, to a patch panel in a telephone central office or in an office building, or to various remote terminals or pedestals, is required. However, in order to efficiently couple the signals transmitted by the respective optical fibers, an optical fiber connector must not significantly attenuate or alter the transmitted signals. In addition, the optical fiber connector must be relatively rugged and adapted to be connected and disconnected a number of times in order to accommodate changes in the optical fiber transmission path.

In order to provide the desired signal transmission characteristics, a number of optical fiber connectors have been developed which are mounted to the end portion of an optical fiber during a factory assembly process. By mounting the optical fiber connector to the optical fiber and/or optical fiber cable (hereinafter optical fiber) during an assembly process at the factory, the assembly of the optical fiber connector can be standardized such that inconsistent assembly and other problems associated with the field installation of the connector are avoided.

However, the factory installation of optical fiber connectors is not altogether satisfactory for every application. In particular, the factory installation of optical fiber connectors does not customize the installation process to account for the myriad of design variations experienced in the field. For example, by installing optical fiber connectors to the end portion of an optical fiber at the factory, the length of the connectorized optical fiber is fixed, thus requiring excess length and coiling to insure sufficient length for all applications. In addition, in many instances, it is desirable to cut a length of optical fiber into a plurality of shorter lengths of optical fiber, each of which must be individually connected, such as by an optical fiber connector, to another optical fiber or to a patch panel or other type of terminal. However, the respective lengths of the shorter optical fibers cannot generally be determined until the optical fibers are installed in the field. Thus, in this instance, the requisite optical fiber connectors cannot be mounted to the fibers at the factory prior to installation of the optical fiber. Still further, it is desirable in many instances to package and ship optical fiber prior to the installation of the optical fiber connectors since the optical fiber connectors generally have a greater diameter than the respective optical fiber, and may unnecessarily complicate the packaging and shipping of the optical fiber.

Consequently, several optical fiber connectors have been developed which can be mounted to the end portion of an optical fiber in the field once the particular application of the optical fiber has been determined. For example, U.S. Pat. No. 5,040,867, which issued Aug. 20, 1991 to Michael de Jong et al. and is assigned to the assignee of the present invention, discloses an optical fiber connector adapted for installation in the field. One embodiment of the optical fiber connector of U.S. Pat. No. 5,040,867 is the Camlite® connector which is also manufactured and distributed by Coming Cable Systems LLC.

The Camlite® connector includes a lengthwise extending ferrule defining a longitudinal bore therethrough attached to a V-groove splice with a camming means for securing a fiber in the splice. A short length of optical fiber, typically termed an optical fiber stub, is disposed in the bore of the ferrule and extends into the V-groove splice. In the field, the end portion of an optical fiber, typically termed the field fiber, to which the optical fiber connector is to be connected, can be inserted in the V-groove splice from the end opposite the ferrule. Due to the precise alignment of the longitudinally extending V-groove within the Camlite® connector, the end portion of the field fiber is aligned with the optical fiber stub and thereafter held in place by activating the camming means.

The Camlite® connector can also include a crimp tube mounted to the end of the V-groove opposite the ferrule such that the field fiber extends therethrough. By compressing the crimp tube radially inward so as to contact the buffer, sheath or jacket of the field fiber cable, the field fiber is fixed in position relative to the ferrule and the aligned optical fiber stub. The ferrule of the Camlite® connector can, in turn, be disposed within any of the standard connector housings. For example, the ferrule of the Camlite® connector is compatible with and can be mounted within an FC, ST or SC connector housing. The resulting Camlite® connector can then be connected, such as with an adapter or coupling sleeve, to the end portion of another optical fiber which also has an appropriate connector mounted to an end portion thereof. Alternatively, the resulting Camlite® connector can be connected to a patch panel, remote terminal or pedestal.

While the Camlite® connector was a great advance in the art, the drive to miniaturize optical connectors continues unabated. This has required constant innovation, most particularly in the area of field installable connectors such as the MU connector. Prior art MU offerings have been limited to either plug and play pre-terminated cable assemblies or epoxy and polish connectors. Plug and play solutions, that is, pre-terminated cable assemblies, are simple to field install, but are expensive and require the exact length of the fiber run to be known prior to manufacture, or require storage of slack coils of optical fibers upon installation. Epoxy and polish type connectors are suitable for all applications (including back of panel, transceiver, jumper applications) but require specialized equipment (such as polishers and ovens) and labor intensive processing (curing, polishing). Field installable connectors offer an advantage over both the plug and play solution and the epoxy and polishing connectors in that they are less expensive than the plug and play solution and do not require the specialized equipment or labor intensive processing associated with the epoxy and polish connectors. The present invention offers the advantages of a field installable connector packaged for ease of assembly in a small form MU connector envelope.

SUMMARY

A broad aspect of the invention includes a first connector subassembly for an optical fiber connector comprising a ferrule holder having a flange at a first end thereof, a spring element retainer slidably mounted on the ferrule holder, a spring element slidably mounted on the ferrule holder between the ferrule flange and the spring element retainer, and a collar mounted on the ferrule holder at a second end thereof so as to capture the spring element and the spring element retainer between the flange and the collar. Preferably, the first connector subassembly further includes an optical fiber stub disposed within the ferrule, the ferrule preferably being further disposed within the ferrule holder.

In another broad aspect of the invention an optical fiber connector includes an inner housing defining an interior passageway extending longitudinally between a forward end and a rearward end, a first connector subassembly inserted through the rearward end of the inner housing into the interior passageway thereof, the first subassembly comprising a ferrule holder having a flange disposed at a first end thereof, a ferrule disposed within the ferrule holder, an optical fiber stub disposed within the ferrule, a spring element and a spring element retainer slidably mounted on the ferrule holder, and a collar mounted on a second end of the ferrule holder so as to capture the spring and the spring element retainer between the flange and the collar.

In a particular embodiment of the optical fiber connector, the spring element retainer is secured within the inner housing by cooperative engaging elements, and the spring element and spring element retainer are arranged so as to urge the ferrule holder forward with a predetermined spring force. The predetermined spring force is preferably greater than about 1 lb.; more preferably between about 1 lb. and 1.5 lbs; and most preferably between about 1.1 lbs. and 1.4 lbs. In accordance with that embodiment, the optical fiber connector further comprises an adapter mounted on the cam member for rotating the cam member relative to the splice holder. The cam adapter is preferably adapted to engage with a conventional tool for rotating the cam member relative to the splice holder.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. Although the inventive optical fiber connector disclosed herein is generally described as an MU connector, it should be understood that the choice of an MU connector is for illustrative purposes only, and that the principals as described herein may be applied to other optical fiber connectors as well, such as without limitation SC, ST and FC connectors.

It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operations of the invention.

DETAILED DESCRIPTION

Detailed references will now be made to the drawings in which examples embodying this invention are shown. The drawings and detailed description provide a full and detailed written description of the invention, and of the manner and process of making and using it, so as to enable one skilled in the pertinent art to make and use the invention, as well as the best mode of carrying out the invention. However, the examples set forth in the drawings and detailed description are provided by way of explanation of the invention and not meant as a limitation of the invention. This invention thus includes any modifications and variations of the following examples as come within the scope of the appended claims and their equivalents.

The detailed description uses numerical and letter designations to refer to features in the drawings. Like or similar designations in the drawings and description have been used to refer to like or similar parts of the invention.

Figure 1:
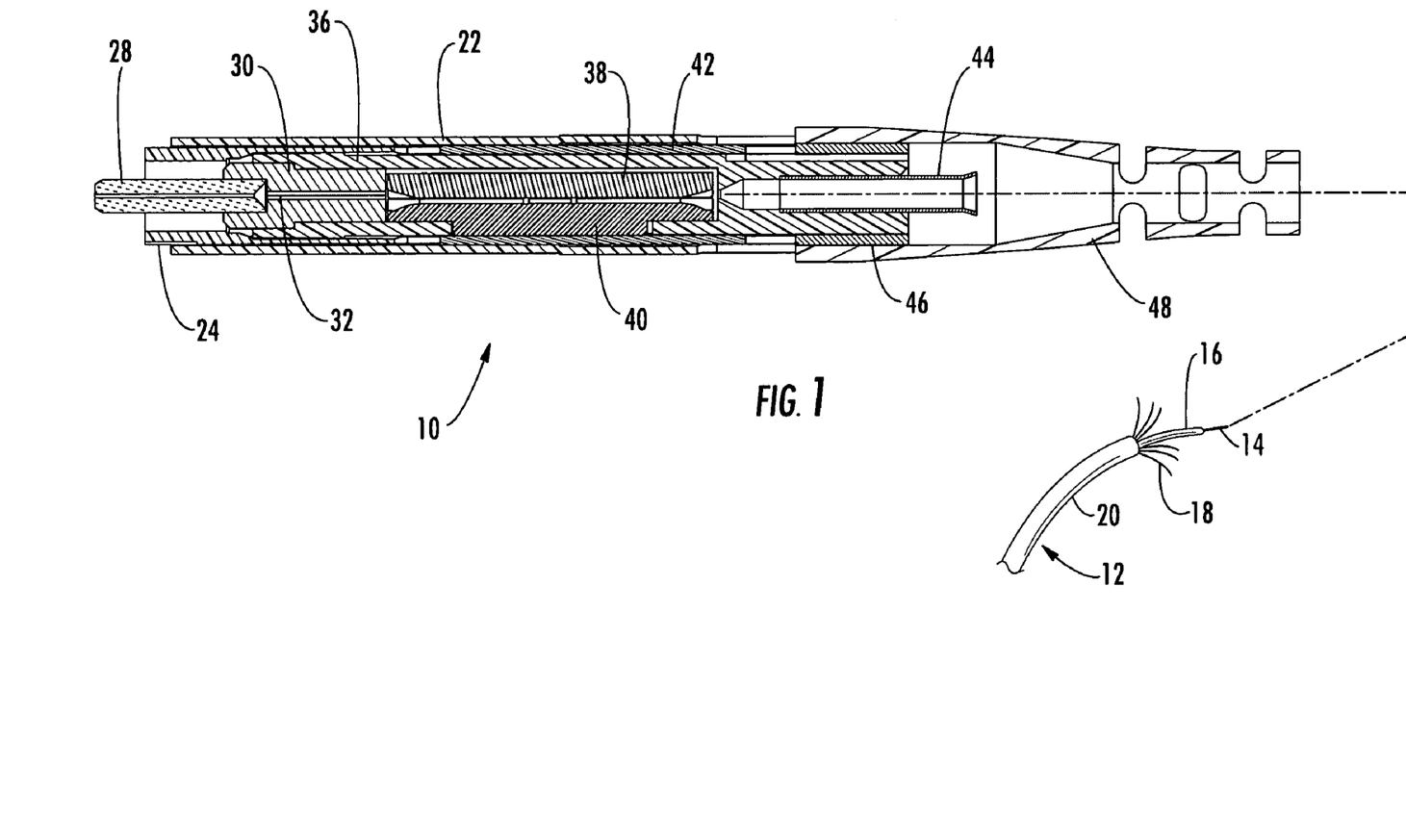
FIG. 1 is a longitudinal cross section view of an optical fiber connector according to an embodiment of the present invention.

As embodied in FIG. 1, an optical fiber connector 10 for connecting optical fiber cable 12 to a receptacle (not shown), such as another connector or optical device, is provided. With more particular reference to FIGS. 1-4, connector 10 is mounted upon an end portion of optical fiber 14, hereinafter referred to as field fiber 14, of optical fiber cable 12. In addition to field fiber 14, optical fiber cable 12 typically includes one or more protective coatings 16 disposed about field fiber 14. Such protective coatings, typically comprised of an acrylate material, may range from an outer diameter of about 245 μm to 900 μm for a buffered optical fiber. Optical fiber cable 12 may also include strength members 18, such as an aramid yarn, and protective sheath or jacket 20 in a conventional manner.

Figure 2:
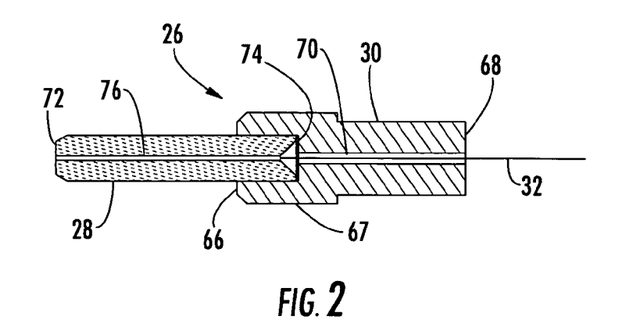
FIG. 2 is a longitudinal cross section view of a first connector subassembly according to the invention taken along line 2-2 in FIG. 3.

Connector 10 includes connector outer housing 22, inner housing 24, and, as best seen in FIG. 2, first connector subassembly 26 comprising ferrule 28, ferrule holder 30 and optical fiber stub 32. Connector 10 also includes second connector subassembly 34, best shown in FIG. 4, comprising splice holder 36, first and second splice members 38, 40 respectively, cam member 42 and crimp tube 44. Connector 10 may further include crimp band 46 and boot 48 as depicted in FIG. 1.

Figure 5:
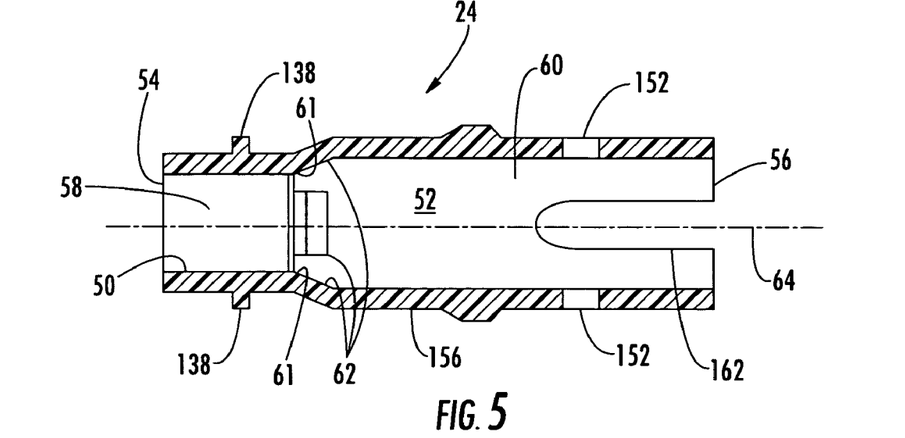
FIG. 5 is a longitudinal cross section view of an inner housing according to the invention

As shown in greater detail in FIG. 5, inner housing 24 comprises inner surface 50 defining generally tubular passageway 52 which extends longitudinally between inner housing first end 54 and second end 56. Passageway 52 includes a forward portion 58 and a rearward portion 60, the forward portion 58 of passageway 52 having a smaller diameter than the rearward portion 60 and being axially aligned with rearward portion 60. Transitional region 61 separates forward portion 58 from rearward portion 60, and is typically a sloping region resulting from the change in diameter between the forward and rearward portions of passageway 52. The inner surface 50 also defines steps 62, which may be more clearly seen in FIG. 7.

Figure 3:
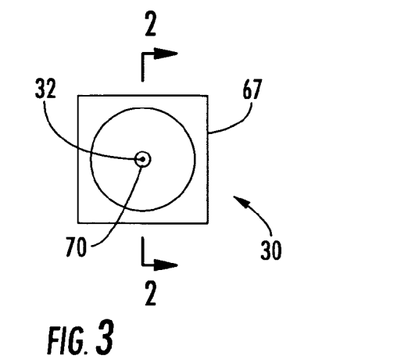
FIG. 3 is a forward end view of a ferrule holder according to the invention showing the ferrule holder flange.

As illustrated in FIG. 2, ferrule holder 30 extends longitudinally between first end 66 and second end 68, and defines passageway 70 extending axially therebetween. Ferrule holder first end 66 is configured to receive and hold at least a portion of ferrule 28, typically via an enlargement of passageway 70 proximate ferrule holder first end 66. That portion of ferrule holder 30 adjacent first end 66 preferably comprises flange 67. Flange 67, as depicted in FIG. 3, is preferably rectangular such that flange 67 slidably engages with steps 62 to position ferrule holder 30 within inner housing 24. Ferrule 28 may be manufactured from any suitable, wear-resistant material such as ceramic, glass, metal or glass-reinforced epoxy. Ferrule 28, as shown in FIG. 2, has a first end 72 and a second end 74 and defines a bore 76 extending axially therebetween. Optical fiber stub 32 is inserted into ferrule bore 76 and preferably secured within bore 76, such as, for example, with an epoxy or other adhesive, such that a portion of optical fiber stub 32 extends rearwardly from ferrule second end 74. Thereafter, ferrule first end 72, including the end portion of optical fiber stub 32 that is exposed via bore 76 at ferrule first end 72, is precision polished. In contrast to the end of the optical fiber stub 32 which extends through the first end of ferrule 28 and which is precision polished, the other end of the optical fiber stub which extends through the ferrule second end 74 is typically precision cleaved in order to facilitate subsequent splicing to field fiber 14. Preferably, optical fiber stub 32 is cleaved at a cleave angle of less than about 1° or at an angle of 8°±1°. Optical fiber stub 32 is sufficiently long that when ferrule 28 is mounted in ferrule holder 30, that portion of optical fiber stub 32 which extends beyond second end 74 of ferrule 28 extends also beyond ferrule holder second end 68. Depending upon the eventual use of connector 10, and the type of optical fiber upon which connector 10 is mounted, optical fiber stub 32 may be either a multi-mode or a single mode optical fiber stub.

Figure 4:
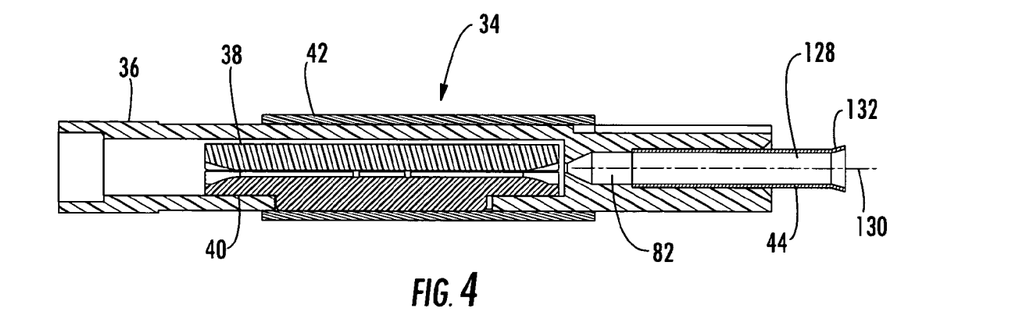
FIG. 4 is a longitudinal cross section view of a second connector subassembly according to the invention.
Figure 6:
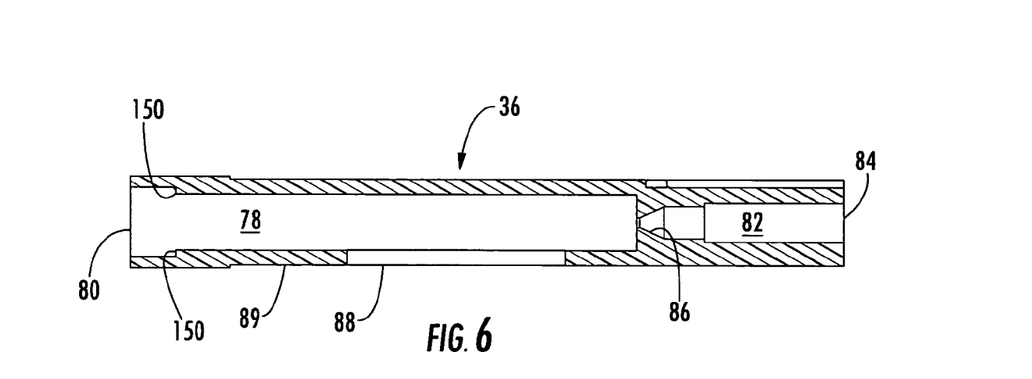
FIG. 6 is a longitudinal cross section view of a splice holder according to the invention.

As previously described, second connector subassembly 34 as shown in FIG. 4 comprises splice holder 36, first and second splice members 38 and 40, cam member 42 and crimp tube 44. As is more clearly illustrated in FIG. 6, splice holder 36 defines cavity 78 extending rearward from first end 80 of splice holder 36 to an intermediate position therein, and is in communication with passageway 82, also defined by splice holder 36, which extends forward from splice holder second end 84, opposite first end 80, to splice holder cavity 78. Preferably, a portion 86 of passageway 82 adjacent cavity 78 has a generally conical shape for guiding field fiber 14 through passageway 82 into cavity 78 and between splice members 38, 40, thereby acting as a lead-in for field fiber 14 upon which the connector 10 will be mounted. By forming the lead-in feature in situ within splice holder 36, the need for a separate lead-in tube may be eliminated.

Splice holder 36 also defines a slot, or window 88 extending between outside surface 89 of splice holder 36 and cavity 78 to accommodate a portion of second splice member 40. First and second splice members 38, 40 are inserted into cavity 78 through splice holder forward end 80 and positioned proximate window 88 as shown in FIG. 4. The mechanical splice members 38, 40 are preferably formed of a thermoplastic material, such as a polyetherimide resin, but may be formed of other materials if so desired.

Figures 7, 8:
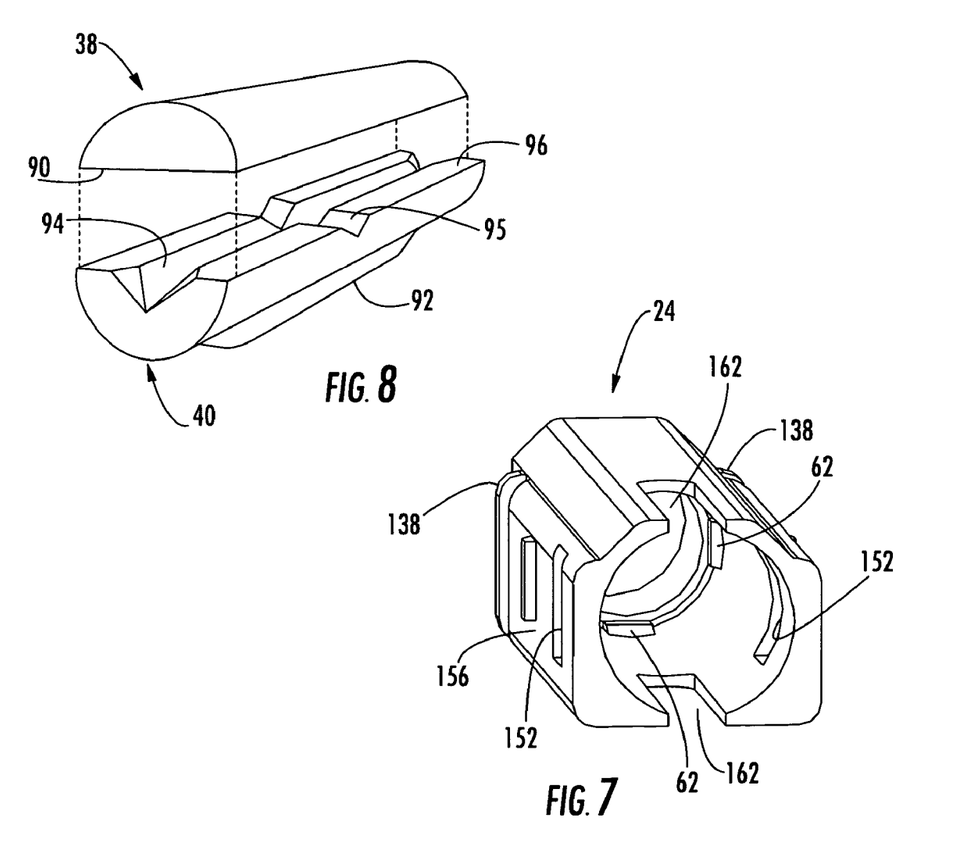
FIG. 7 is a front perspective view of the inner housing of FIG. 5.
FIG. 8 is a perspective view of first and second splice members according to the invention.

As depicted by FIG. 8, first splice member 38 is configured with a flat face 90 opposing second splice member 40. Second splice member 40 comprises a projection, or keel portion 92 which engages with and protrudes through window 88 when splice members 38, 40 are inserted into splice holder cavity 78. Second splice member 40 also defines groove 94 extending longitudinally along the length of second splice member 40 on side 96 opposite keel portion 92 and opposing flat face 90 of first splice member 38. Alternatively, groove 94 could be formed in the opposing face of first splice component 38 and a flat face could be formed on the opposing face of second splice member 40. Groove 94 is shown in FIG. 8 as generally V-shaped. For splice members having a V-shaped groove, the V-shaped groove preferably defines an interior angle of about 60°. However it should be understood that groove 94 could define other interior angles, or other shapes capable of supporting optical fiber stub 32 and field fiber 14 without departing from the scope of the present invention. To facilitate the optical connection of optical fiber stub 32 and field fiber 14, a medial portion of the groove may be filled with a refractive index matching gel prior to the insertion of the field fiber therein. Further, second splice member 40 may define one or more laterally extending vents 95 to allow the index matching gel to the medial portion of groove 94 and thereby allow the migration of the refractive index matching gel to the ends of the splice members. Groove 94 may be flared at one or both ends thereof to facilitate guiding optical fiber stub 32 and/or field fiber 14 into groove 94.

Figure 9:
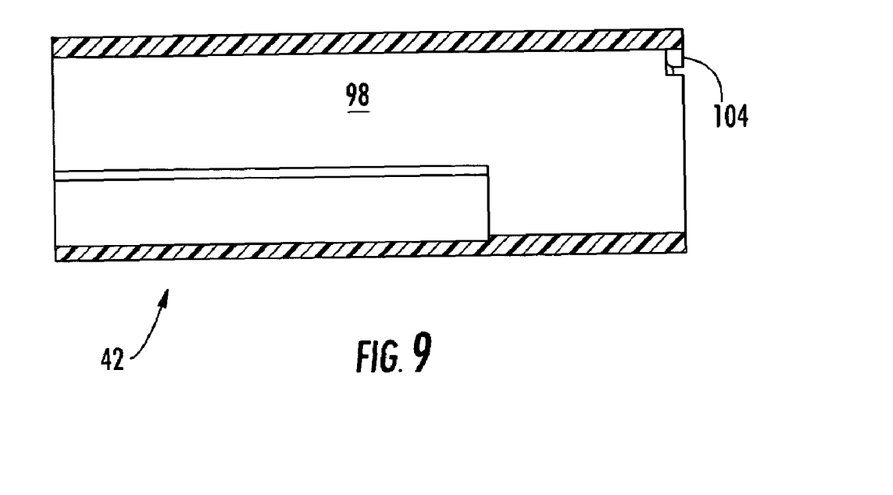
FIG. 9 is a longitudinal cross section view of a cam member according to the invention.
Figure 10:
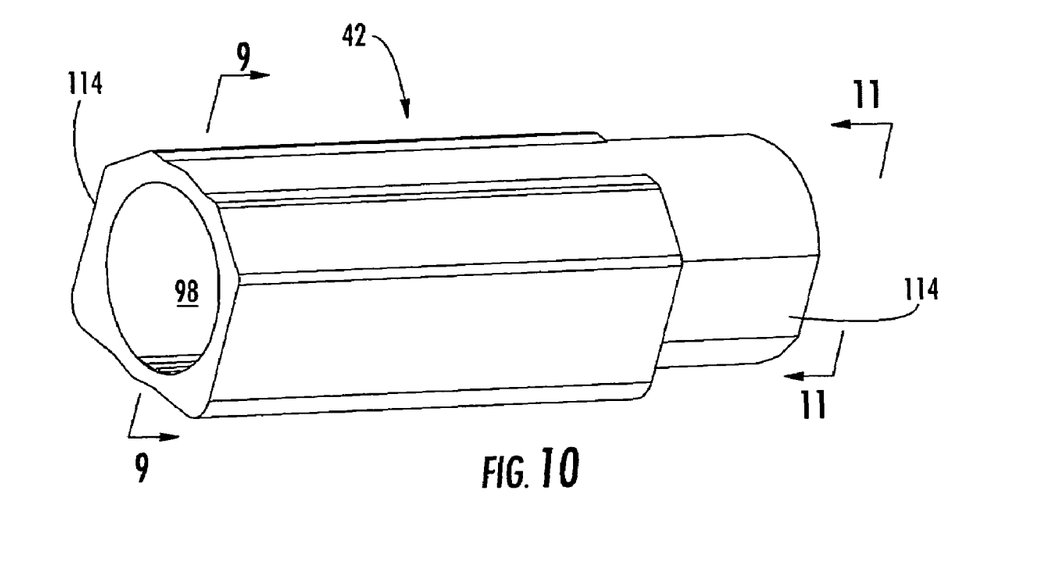
FIG. 10 is a perspective view of the cam member of FIG. 9.
Figure 11:
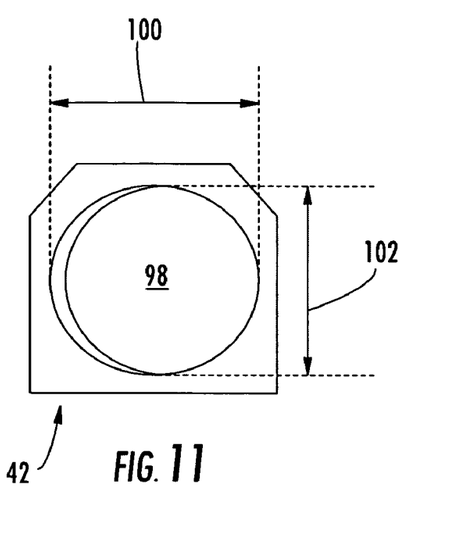
FIG. 11 is an end view of the cam member of FIG. 10.

Referring again to FIG. 4, cam member 42 is mounted on splice holder 36 in an initial position generally axially aligned with splice members 38, 40. As best illustrated by FIG. 9-10, cam member 42 defines longitudinally extending passageway 98 that is sized to receive and therefore be mounted upon splice holder 36. To actuate splice members 38, 40, at least a portion of passageway 98 defined by cam member 42 is preferably noncircular in lateral cross section and comprises a major axis and a minor axis. As illustrated by FIG. 11, the portions of passageway 98 adjacent major axis 100 have a smaller radius than the radius of those portions of passageway 98 immediately adjacent minor axis 102. Moreover, passageway 98 is defined by cam member 42 such that the smaller radius of passageway 98 immediately adjacent major axis 100 smoothly transitions into the larger radius of passageway 98 immediately adjacent minor axis 102.

Figures 12, 13:
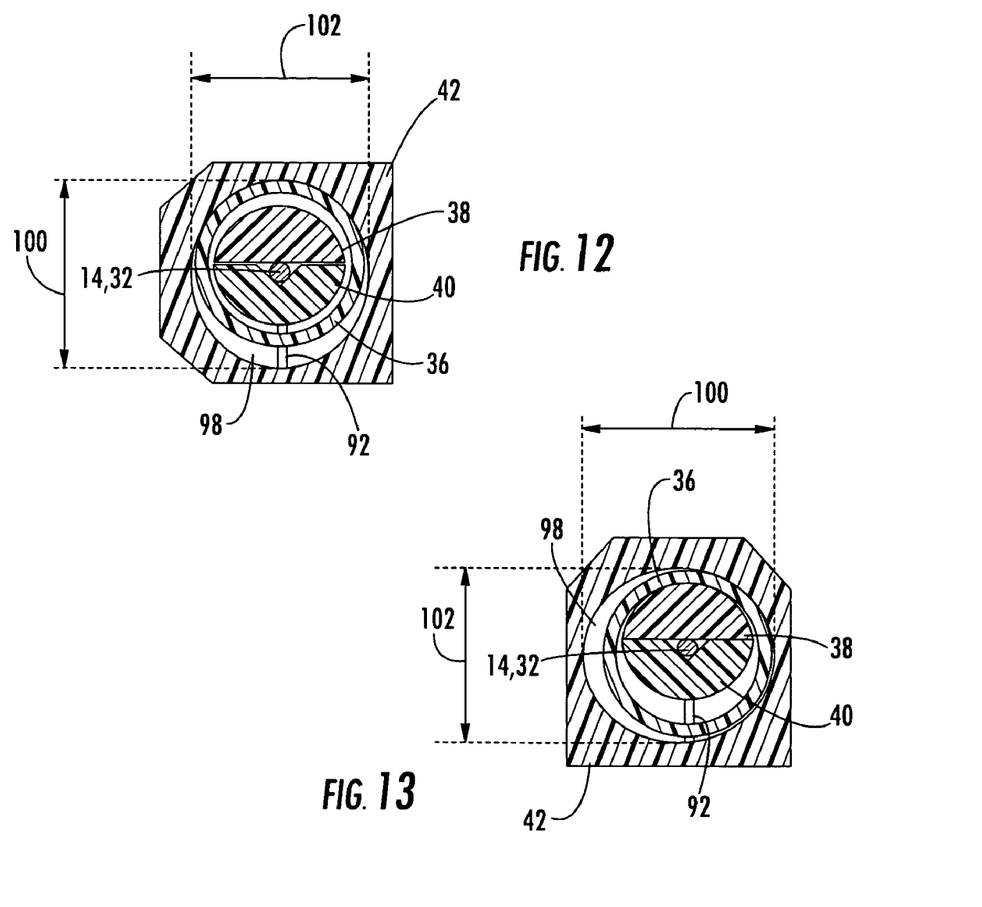
FIG. 12 is a lateral cross section view of the cam member of FIG. 11 showing the orientation of the cam and splice members in a first, unactuated position.
FIG. 13 is a lateral cross section view of the cam member of FIG. 11 showing the orientation of the cam and splice members in a second, actuated position.
Figure 14:
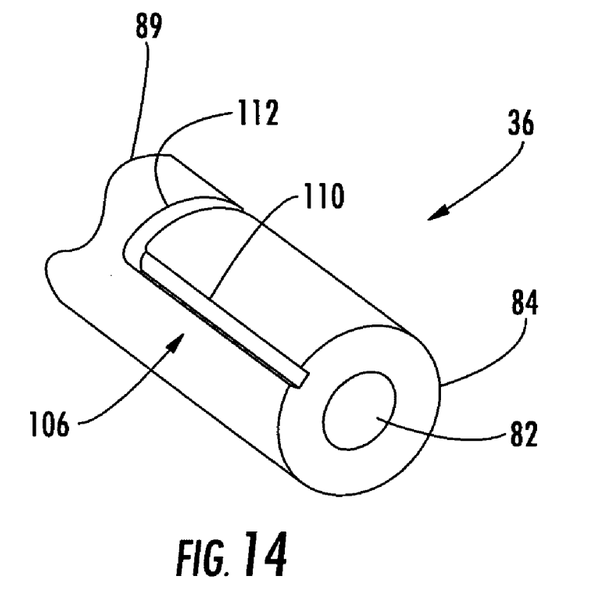
FIG. 14 is a partial perspective view of the second end of the splice holder of FIG. 6 showing the groove for guiding the cam member of FIG. 9.
Figure 15:
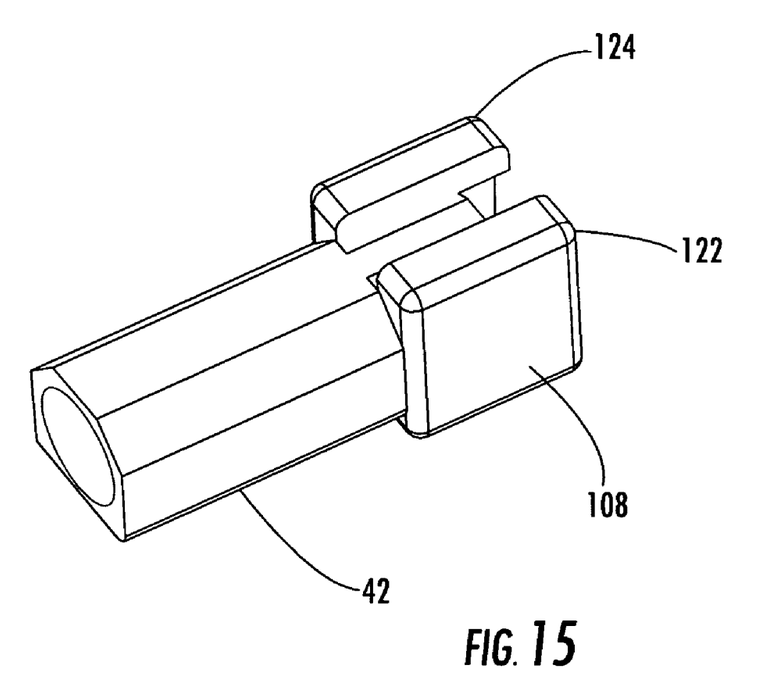
FIG. 15 is a perspective view of a cam member adapter according to the invention mounted on the cam member of FIG. 9.

As shown by FIGS. 12 and 13, cam member 42 is mounted on splice holder 36 such that exposed keel portion 92 of second splice member 40 which extends through window 88 is aligned with major axis 100 of cam member passageway 98. As a result, cam member 42 can be readily mounted on splice holder 36 while splice members 38 and 40 remain unactuated, as depicted in FIG. 12. As shown in FIG. 13, once cam member 42 has been mounted upon splice holder 36, however, cam member 42 can be rotated relative to splice holder 36 from the first unactuated position to a second actuated position so that the exposed keel portion 92 of second splice member 40 initially aligned with major axis 100 of passageway 98 is subsequently aligned with minor axis 102 of passageway 98. Due to the smaller dimensions of passageway 98 along minor axis 102, cam member 42 operably contacts exposed keel portion 92 of second splice member 40 following rotation of cam member 42 relative to splice holder 36. As a result of this contact, cam member 42 actuates splice members 38, 40, such as by urging first and second splice members 38, 40 toward one another, so as to secure (mechanically splice) optical fiber stub 32 and field fiber 14 therebetween in abutting relation. 491 As also shown in FIG. 9, cam member 42 preferably includes an inwardly extending projection 104. While the inwardly extending projection 104 is adjacent one end of cam member 42 in the illustrated embodiment, the inwardly extending projection 104 can be positioned at other points along the lengthwise extending passageway 98, if so desired. As shown in FIG. 14, the outer surface 89 of splice holder 36 also preferably defines a groove 106 extending from second end 84 for receiving the inwardly extending projection 104. By confining the inwardly extending projection 104 within groove 106, splice holder 36 can guide cam member 42 as cam member 42 is initially mounted upon splice holder 36, i.e. slid lengthwise relative to splice holder 36, and as cam member 42 is subsequently rotated relative to splice holder 36 from the first, unactuated position to the second, actuated position. Cam member 42 may also include optional cam member adapter 108 mounted on cam member 42, as depicted in FIG. 15, for facilitating rotation of cam member 42 relative to splice holder 36.

In the embodiment illustrated in FIG. 14, the groove 106 defined by splice holder 36 is generally L-shaped. As such, groove 106 includes a first section 110 that extends lengthwise along a portion of splice holder 36 from splice holder second end 84 to a medial portion of splice holder 36. In addition, groove 106 includes a second section 112 that extends circumferentially about a portion, such as one-quarter, of splice holder 36. As such, the inwardly extending projection 104 of cam member 42 is moved through the first section 110 of groove 106 as cam member 42 is inserted lengthwise relative to splice holder 36 and mounted thereon. Thereafter, the inwardly extending projection 104 of cam member 42 is moved through the second section 112 of groove 106 as cam member 42 is rotated relative to splice holder 36. First and second sections 110, 112 of groove 106 of this embodiment are preferably orthogonal and intersect in the medial portion of splice holder 36 to permit cam member 42 to be rotated relative to splice holder 36 once cam member 42 has been fully mounted upon splice holder 36.

As described above, cam member 42 is in the first unactuated position as cam member 42 is mounted upon splice holder 36 by moving the inwardly extending projection 104 through the first section 110 of groove 106. As also described, cam member 42 transitions from the first, unactuated position to the second, actuated position as cam member 42 is rotated relative to splice holder 36 by moving the inwardly extending projection 104 through the second section 112 of groove 106. In the embodiment in which cam member passageway 98 includes a major axis 100 and a minor axis 102, exposed second splice member keel portion 92 is aligned with major axis 100 of cam member passageway 98 as inwardly extending projection 104 of cam member 42 is moved through first section 110 of groove 106. Correspondingly, cam member 42 and splice holder 36 are also preferably adapted such that the exposed keel portion 92 of second splice member 40 is moved along the inside surface of cam member 42 from alignment with the major axis 100 of passageway 98 to alignment with the minor axis 102 of passageway 98 as the inwardly extending projection 104 is moved through the second section 112 of groove 106. By engaging exposed second splice member keel portion 92 with the inside surface of cam member 42 along the minor axis 102 of passageway 98, splice components 38, 40 are actuated, such as by urging first and second splice members 38, 40 toward one another, so as to secure (mechanically splice) optical fiber stub 32 and field fiber 14 in abutting relation, as previously described.

By confining the inwardly extending projection 104 of cam member 42 to the generally L-shaped groove 106, the optical fiber connector 10 insures that cam member 42 is fully mounted upon splice holder 36 prior to actuating splice members 38, 40 by rotating cam member 42 relative to splice holder 36, thereby providing complete or full actuation of splice members 38, 40. In addition, connector 10 prevents cam member 42 from being removed from splice holder 36 without first being moved to an unactuated position by rotating cam member 42 in the opposite direction relative to splice holder 36 so as to move the inwardly extending projection 104 from second section 112 of groove 106 in which splice members 38, 40 are actuated to first section 110 of groove 106 in which splice members 38, 40 are unactuated. Thus, connector 10 prevents inadvertent damage to the components of the optical fiber connector which could otherwise possibly be incurred by removing cam member 42 from splice holder 36 while in the actuated position. Once splice members 38, 40 have been actuated, such as by mounting cam member 42 upon the splice holder 36, and thereafter rotating cam member 42 relative to splice holder 36, the remaining components of optical fiber connector 10 may be assembled. Preferably, cam member 42 comprises flats 114 (see FIG. 10) to aid in the rotation of cam member 42 relative to splice holder 36 by engaging with a tool for performing such rotation. In the embodiment depicted in FIG. 10, cam member 42 comprises two flats 114 arranged opposite and parallel to each other on opposite sides of cam member 42. However, it should be understood that other possible configurations are within the scope of the invention.

Figure 16:
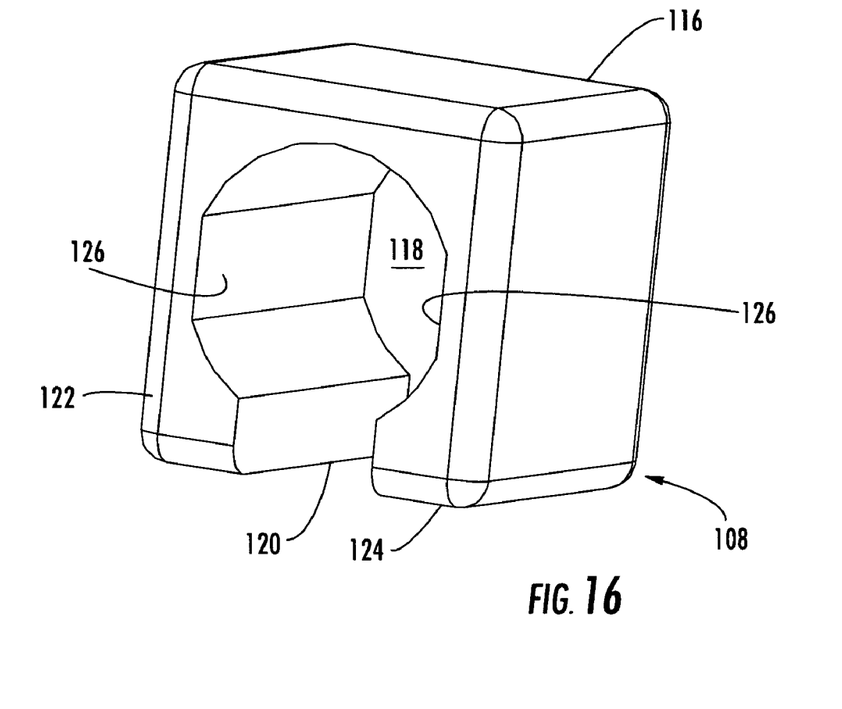
FIG. 16 is an enlarged perspective view of the cam member adapter of FIG. 15.

Optional cam member adapter 108, illustrated in FIG. 15-16, may be mounted on cam member 42 for adapting the cam member to a conventional tool (not shown) for rotating cam member 42 relative to splice holder 36. The exemplary adapter 108 shown in FIG. 16 comprises a body 116 having a passageway 118 extending therethrough. A channel 120 along one side of the body separates the body into two arms, 122 and 124. Adapter 108 may be mounted on cam member 42, for example, by sliding adapter 108 forward from the rear of cam member 42, which has been mounted on splice holder 36. The inside surface of adapter 108 is adapted to engage with at least a portion of the outside surface of cam member 36. For example, flat portions 126 formed on the inside surface of adapter 108 may engage with flats 114 formed on the outside surface of cam member 42. The outside surface of adapter 108, on the other hand, is adapted to engage with the tool. A suitable tool is Model No. 2109002-01 available from Corning Cable Systems LLC of Hickory, N.C.

Second connector subassembly 34 shown in FIG. 4, may be completed by inserting crimp tube 44, typically composed of copper, brass, stainless steel or aluminum into splice holder passageway 82 through splice holder second end 84. While crimp tube 44 may be mechanically press fit into splice holder passageway 82, crimp tube 44 is preferably secured with an adhesive or the like, such as an epoxy. As shown in FIG. 4, crimp tube 44 defines lengthwise extending passageway 128 having a generally circular shape in lateral cross section for receiving and retaining field fiber 14. In particular, passageway 128 is sized so as to appropriately align field fiber 14 and protective sheath 20 in such a manner that the end portion of the field fiber 14 which extends through the crimp tube can be readily inserted into second splice member groove 94. In this regard, generally circular passageway 128 preferably defines longitudinal axis 130 that extends in a direction parallel to, and preferably coplanar with the splice plane. To facilitate insertion of field fiber 14, crimp tube 44 may include a flared portion 132 adjacent one end thereof for receiving field fiber 14.

Figure 17:
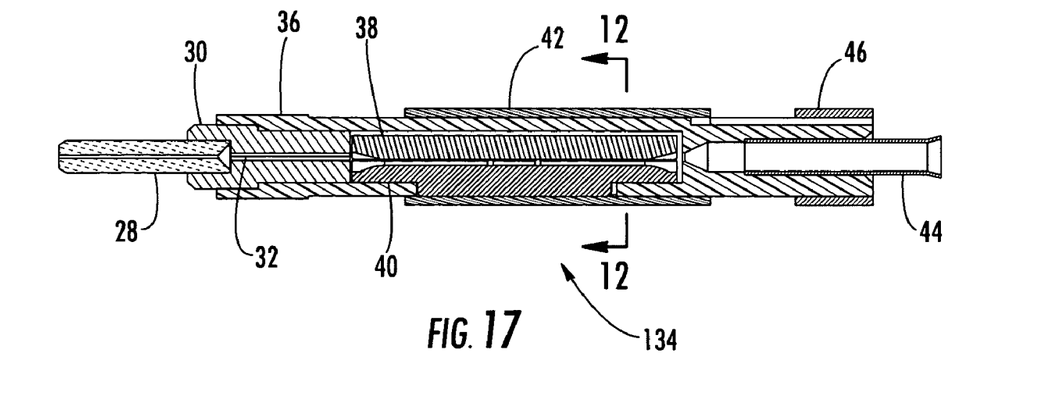
FIG. 17 is a longitudinal cross section view of another embodiment of a first connector subassembly according to the invention.

As described above, an optical fiber connector 10 according to the present invention may be readily fabricated. In particular, ferrule 28 can be formed and the optical fiber stub 32 disposed therein in a controlled factory environment such that the end of optical fiber stub 32 at ferrule first end 72 can be precision polished. Thereafter, assembly of connector 10 includes assembly of first and second connector subassemblies 26, 34 as previously described. First and second connector subassemblies 26 and 34 are then coupled, such as by inserting first connector subassembly 26 into second connector subassembly 34 to form insert assembly 134 shown in FIG. 17 without optional adapter 108. For example, ferrule holder second end 68 may be inserted into splice holder cavity 78 forward of splice members 38, 40 through splice holder first end 80. Ferrule holder 30 may be press fit within cavity 78, or ferrule holder 30 may be secured by other methods as are known in the art, such as with an epoxy. When ferrule holder 30, including optical fiber stub 32, is coupled to splice holder 36, the end of optical fiber stub 32 extending from ferrule holder second end 68 is received and supported by second splice member groove 94 and terminates between first and second splice members 38 and 40 at a generally intermediate position along the length of groove 94. Splice members 38, 40 are prevented from moving longitudinally within cavity 78 by the second end 68 of ferrule holder 30 and the rearward end of cavity 78. Once insert assembly 134 has been assembled, insert assembly 134 is inserted into inner housing passageway 52 through inner housing second end 56 and secured in place, such as with the retainer 144. Steps 62 slidably engage with the sides of ferrule holder flange 67 to position the assembly within the inner housing. Insert assembly 134 is prevented from rotating within inner housing 24 by the engagement of steps 62 and the sides of ferrule holder flange 67, and also via interference between the inside radius of inner housing 24 and the corners of ferrule holder flange 67.

Field assembly of the optical fiber connector 10 comprises removing a portion of fiber coating 16 from field fiber 14 to expose the bare glass optical fiber. Field fiber 14 is then precision cleaved to form a good end finish, typically with an end angle of less than about 1 degree or within 1° of 8°. The cleaved bare end of field fiber 14 is then inserted through crimp tube 44 to a position in abutment with optical fiber stub 32 and is supported by, and aligned with optical fiber stub 32, by second splice member groove 94. Cam member 42, which has been mounted on splice holder 36 as described above, may then be rotated to actuate splice members 38, 40, thereby securing field fiber 14 and optical fiber stub 32 therebetween in abutting relation. Optional adapter 108 may be mounted on cam member 42 to facilitate engagement of cam member 42 with a conventional tool for rotating cam member 42 relative to splice holder 36. Because of the precision with which splice members 38, 40 are fabricated, second splice member groove 94 precisely aligns and optically interconnects optical fiber stub 32 and field fiber 14 in a predefined splice plane, typically defined to be parallel to the surfaces 90, 96 of the first and second splice members and including the longitudinal axes of optical fiber stub 32 and field fiber 14. Once splice members 38, 40 have been actuated, field fiber 14 may be further engaged by crimping the exposed portion of crimp tube 44 about the coated portion of field fiber 14 so as to mechanically secure crimp tube 44 and field fiber 14 together.

Also as shown in FIG. 1, optical fiber connector 10 may optionally include annular crimp band 46, typically composed of copper, brass or stainless steel or aluminum which is mounted on splice holder 36 adjacent to rearward second end 84 and proximate cam member 42. In embodiments in which field fiber 14 is associated with strength members 18, such as the aramid yarn strength members of a fiber optic cable, strength members 18 can be positioned between crimp band 46 and splice holder 36 such that strength members 18 are securely engaged by crimping crimp band 46 about splice holder 36 as known by those skilled in the art. Thereafter, boot 48, which has previously been positioned over field fiber 14, may be mounted overtop crimp band 46 so as to provide bending relief to field fiber 14. Boot 48 may be secured by a friction fit about either crimp band 46, if crimp band 46 is used, or adjacent splice holder second end 36 if a crimp band is not used, or boot 48 may be secured by cooperative retaining elements, such as detents, configured on the outside surface of splice holder 36 and/or the inside surface of boot 48.

Figure 18:
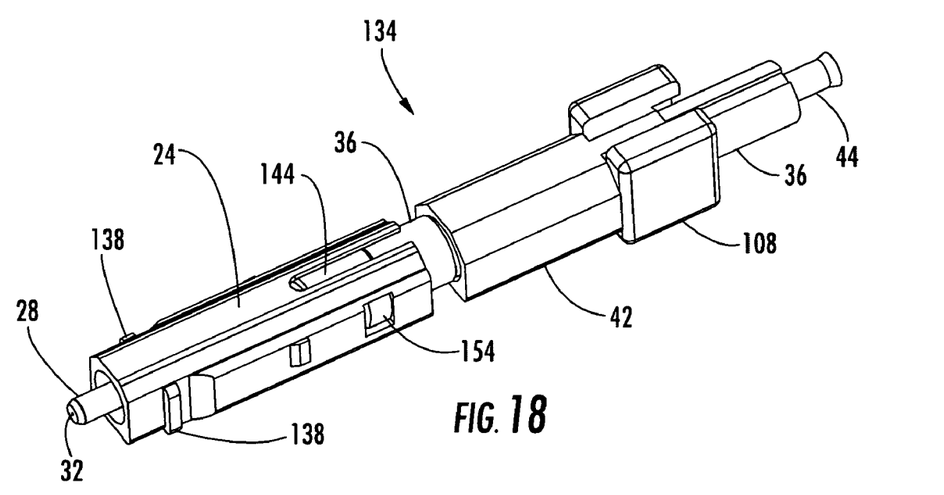
FIG. 18 is a perspective view of the first connector subassembly of FIG. 17 after insertion into the inner housing and including the cam member adapter of FIG. 15.
Figure 19:
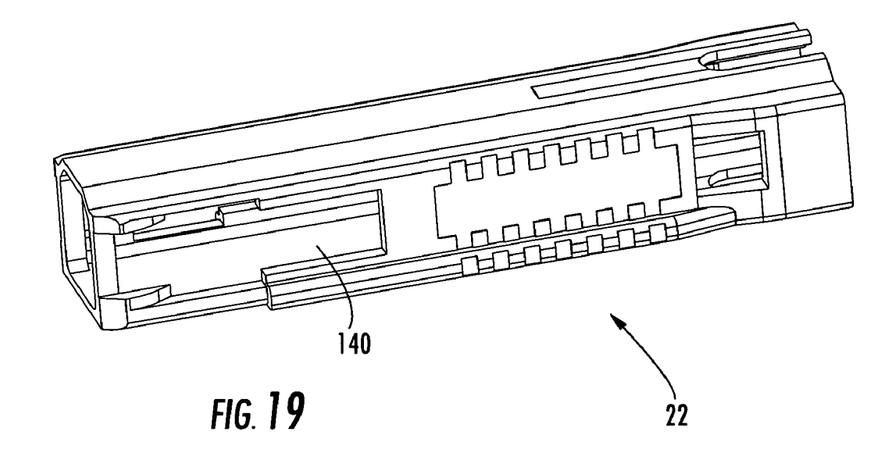
FIG. 19 is a perspective view of an outer housing according to the invention.

In a final step, the assembly comprising inner housing 24 and insert assembly 134 as depicted in FIG. 18 is inserted into outer housing 22, shown in FIG. 19. Prior to inserting inner housing 24 and insert assembly 134 into outer housing 22, adapter 108, if used to facilitate rotation of cam member 42 relative to splice holder 36, is removed, such as by sliding adapter 108 rearward off cam member 42 and passing field fiber 14 through channel 120. As known to those skilled in the art, inner housing 24 typically includes a pair of outwardly extending ledges 138 which engage respective windows 140 defined by outer housing 22 so as to slidably engage the inner housing and the outer housing while preventing inner housing 24 from being withdrawn from outer housing 22. Preferably, at least a portion of the outside surface of inner housing 24 and a portion of the outside surface of cam member 42 are adapted to conform with the inside surface of outer housing 22. The inside surface of outer housing 22 is preferably shaped to prevent rotation of cam member 42 relative to outer housing 22 when cam member 42 has been rotated into the second, actuated position, thereby locking cam member 42 into the second, actuated position while engaged with outer housing 22.

Figure 20:
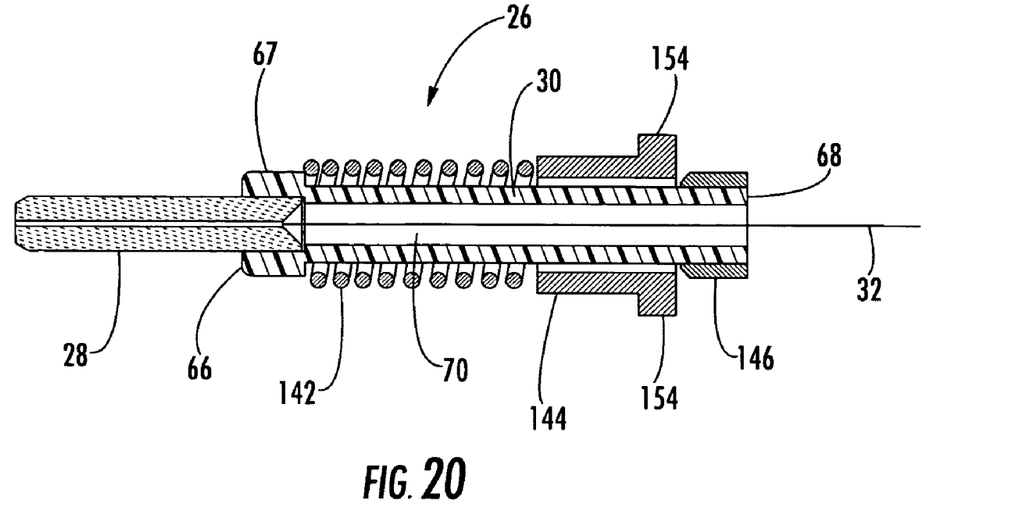
FIG. 20 is a longitudinal cross section view of yet another embodiment of a first connector subassembly including a spring.
Figure 21:
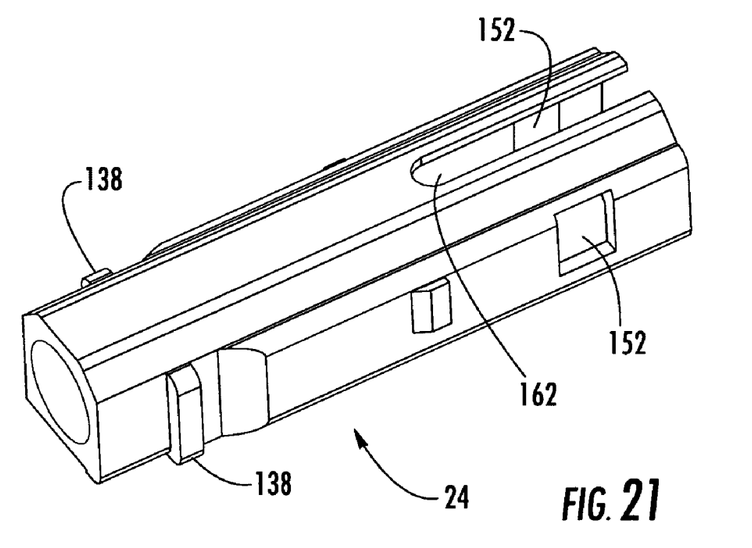
FIG. 21 is a rear perspective view of the inner housing of FIG. 5.

According to another preferred embodiment illustrated in FIG. 20, first connector subassembly 26 may further comprise spring element 142, spring element retainer 144 and collar 146. In accordance with this embodiment, ferrule 28 containing optical fiber stub 32 is inserted into ferrule holder passageway 70 through the first end 66 of ferrule holder 30. Spring element 142 is slidably mounted on ferrule holder 30 and moved forward until spring element 142 abuts the rear edge of ferrule holder flange 67. Spring element retainer 144 is slidably mounted over ferrule holder 30 and moved forward until spring element retainer 144 abuts spring element 142. Collar 146 is then mounted on ferrule holder 30 adjacent second end 68 and abutting spring element retainer 144 such that spring element 142 is compressed between flange 67 and spring element retainer 144. Collar 146 may be secured to ferrule holder 30 with an adhesive, such as, for example, an epoxy adhesive. Alternatively, collar 146 may be press fit onto ferrule holder 30 adjacent second end 68 or retained with cooperative retaining elements such as screw threads or detents.

Second connector subassembly 34 of this embodiment is substantially the same as previously described and will not be described further. When splice members 38, 40 have been positioned within splice holder 30, cam member 42 may be mounted on splice holder 36. Cam member 42 is mounted on, and cooperates with, splice holder 30 in substantially the same way as in the previous embodiment and will not be described further. As in the previous embodiment, an optional adapter 108 may be mounted on cam member 42 for adapting the cam member to a conventional tool for rotating cam member 42 relative to splice holder 36.

Figure 22:
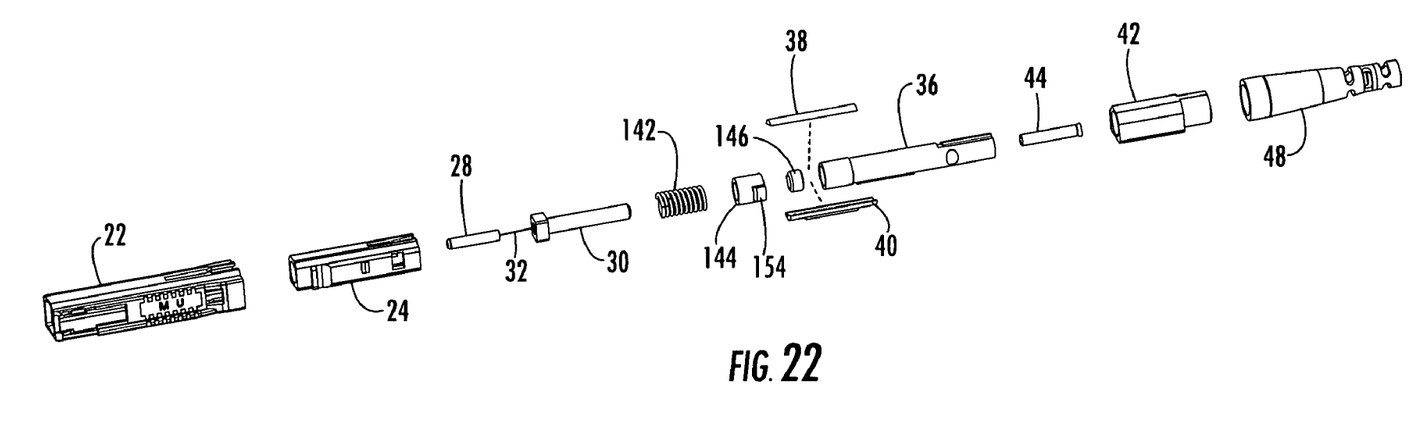
FIG. 22 is an exploded view of an optical fiber connector comprising the first connector subassembly of FIG. 20.
Figure 23:
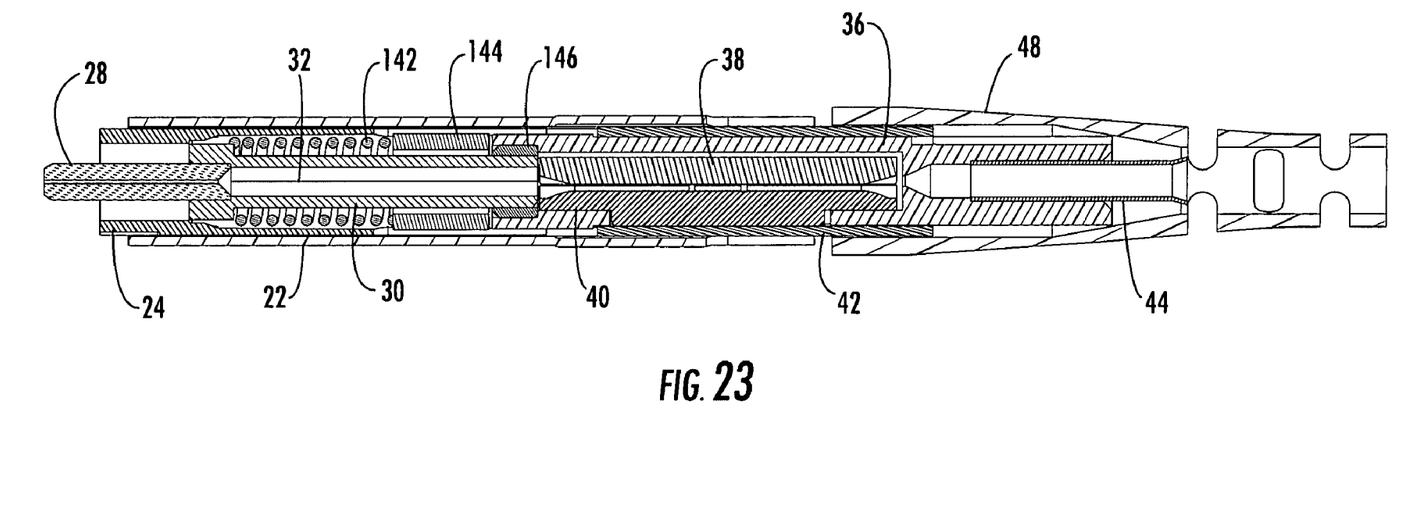
FIG. 23 is a longitudinal cross section view of the optical fiber connector of FIG. 22 shown in the assembled configuration.

Once cam member 42 has been mounted on splice holder 36, first connector subassembly 26 is coupled to second connector subassembly 34 to form insert assembly 134, such as, for example, by inserting second end 68 of ferrule holder 30 into splice holder cavity 78 through splice holder first end 80 until collar 146 abuts shoulder 150 within cavity 78. Insert assembly 134 may then be inserted into passageway 52 of inner housing 24 through second end 56 thereof and secured by cooperative retaining elements such that ferrule holder flange 67 abuts transitional region 61. For example, inner housing 24 may include openings 152 shown in FIGS. 5 and 7 extending from outside surface 156 of inner housing 24 to passageway 52, openings 152 being arranged on opposite sides of inner housing 24. Outwardly extending projections 154 located on spring element retainer 144 are adapted to engage with inner housing openings 152 when insert assembly 134 has been inserted into passageway 52, thereby allowing ferrule holder 30, and ferrule 28, to float within inner housing 24. Spring element retainer 144 is sized to fit snugly within rearward portion 60 of passageway 52 and compress spring element 142 between ferrule holder flange 67 and the spring element retainer 144 when collar 146 has been engaged with ferrule holder 30, whereby ferrule holder 30 is urged forward against transitional region 61 of inner housing 24 with a predetermined spring force. As shown by FIGS. 5 and 7, inner housing 24 preferably defines a pair of opposing slots 162 which allow a rearward portion of inner housing 24 to resiliently flex, thereby facilitating the insertion of spring element retainer 144 into rearward portion 60 of passageway 52. Preferably, the predetermined spring force is greater than about 1 lb.; more preferably between about 1 lb. and 1.5 lbs.; and most preferably between about 1.1 and 1.4 lbs. An exploded view of connector 10 according to the present preferred embodiment is shown in FIG. 22. A view of connector 10 assembled (but not coupled with field fiber 14) is illustrated in FIG. 23. Optional adapter 108 and crimp band 46 are not shown.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

That which is claimed is:

1. An optical fiber connector comprising:
   an inner housing defining an interior passageway extending longitudinally between a forward end and a rearward end;
   a first connector subassembly inserted through the inner housing rearward end, the first connector subassembly comprising a ferrule containing an optical fiber stub disposed within a ferrule holder, the ferrule holder having a flange;
   a second connector subassembly coupled to the first connector subassembly, the second connector subassembly comprising a splice holder having a longitudinally extending cavity and first and second splice members disposed therein;
   a cam member mounted on the splice holder, wherein the cam member is movable between a first position wherein the cam member allows the splice members to move apart and a second position wherein the cam member urges the splice members relatively toward each other;
   a spring element slidably mounted on the ferrule holder;
   a spring element retainer slidably mounted on the ferrule holder rearward of the spring element;
   wherein the first connector subassembly further comprises a collar rigidly mounted on the ferrule holder so as to capture the spring element and the spring element retainer between the collar and the flange; and
   wherein the spring element retainer is secured within the inner housing by cooperative engaging elements, and the spring element and spring element retainer are arranged so as to urge the ferrule holder forward with a predetermined spring force between about 1 lb. and 1.5 lb.

2. The optical fiber connector according to claim 1 further comprising an adapter mounted on the cam member.

3. The optical fiber connector according to claim 1 further comprising a outer housing having a forward end and a rearward end and a passageway extending longitudinally therebetween, wherein the inner housing is inserted into the outer housing passageway through the rearward end thereof.

4. The optical fiber connector according to claim 1 wherein the splice holder cavity includes a refractive index matching gel disposed between the splice members.

5. The optical fiber connector according to claim 1 wherein the cam member rotates relative to the splice holder between the first position and the second position.

6. An optical fiber connector comprising;
an inner housing defining an interior passageway extending longitudinally between a forward end and a rearward end,
a first connector subassembly inserted through the rearward end of the inner housing into the interior passageway thereof, the first connector subassembly comprising a ferrule holder having a flange disposed at a first end thereof, a ferrule disposed within the ferrule holder, an optical fiber stub disposed within the ferrule, a spring element and a spring element retainer slidably mounted on the ferrule holder, and a collar mounted on a second end of the ferrule holder so as to capture the spring and the spring element retainer between the flange and the collar; wherein the spring element retainer is secured within the inner housing by cooperative engaging elements, and the spring element and spring element retainer are arranged so as to urge the ferrule holder forward with a predetermined spring force between about 1 lb. and 1.5 lbs.

7. The optical fiber connector according to claim 6 further comprising a second connector subassembly coupled to the first connector subassembly, the second connector subassembly comprising a splice holder having a longitudinally extending cavity and first and second splice members disposed within the splice holder cavity.

8. The optical fiber connector according to claim 7 further comprising a on member mounted on the splice holder, wherein the cam member is movable between an unactuated position wherein the cam member allows the splice members to move apart and an actuated position wherein the on member urges the splice members relatively toward each other.

9. The optical fiber connector according to claim 8 further comprising an outer housing that prevents the cam member from being moved from the actuated position to the unactuated position.

10. The optical fiber connector according to claim 8 further comprising an adapter mounted on the cam member for cooperating with a conventional tool to rotate the cam member between the unactuated position and the actuated position.

11. An optical fiber connector subassembly comprising;
a ferrule holder having a flange at a first end thereof;
a spring element retainer slidably mounted on the ferrule holder;
a spring element slidably mounted on the ferrule holder between the ferrule flange and the spring element retainer; and
a collar mounted on the ferrule holder at a second end thereof so as to capture the spring element and the spring element retainer between the flange and the collar such that the spring element and spring element retainer arrangement urges the ferrule holder forward with a predetermined spring force between about 1 lb. and 1.5 lbs.

12. The optical fiber connector subassembly according to claim 11 further comprising a ferrule mounted in the ferrule holder.

13. The optical fiber connector subassembly according to claim 12 further comprising an optical fiber stub disposed within the ferrule.

14. The optical fiber connector subassembly according to claim 13 mounted within a field installable optical fiber connector that is adapted for mechanically securing the optical fiber stub to a field fiber in abutting relation.

* * * * *